(12) United States Patent
Fan et al.

(10) Patent No.: US 12,057,768 B2
(45) Date of Patent: Aug. 6, 2024

(54) RIPPLE AMPLITUDE COMPENSATION CIRCUIT FOR RIPPLE BASED CONTROL OF DC-DC CONVERTER

(71) Applicant: Reed Semiconductor Corporation, Warwick, RI (US)

(72) Inventors: Jiwei Fan, Cary, NC (US); Yingqian Ma, Shenzhen (CN); Yifan Dong, Shenzhen (CN)

(73) Assignee: Reed Semiconductor Corporation, Warwick, RI (US)

( * ) Notice: Subject to any disclaimer, the term of this patent is extended or adjusted under 35 U.S.C. 154(b) by 213 days.

(21) Appl. No.: 17/809,413

(22) Filed: Jun. 28, 2022

(65) Prior Publication Data
US 2023/0421052 A1 Dec. 28, 2023

(51) Int. Cl.
*H02M 1/14* (2006.01)
*H02M 1/00* (2006.01)
*H02M 3/158* (2006.01)

(52) U.S. Cl.
CPC ......... *H02M 1/143* (2013.01); *H02M 1/0016* (2021.05); *H02M 1/0019* (2021.05); *H02M 1/0022* (2021.05); *H02M 1/0025* (2021.05); *H02M 3/158* (2013.01)

(58) Field of Classification Search
CPC ............ H02M 1/0016; H02M 1/0019; H02M 1/0022; H02M 1/0025; H02M 1/143; H02M 3/156; H02M 3/158
See application file for complete search history.

(56) References Cited

U.S. PATENT DOCUMENTS

| | | | |
|---|---|---|---|
| 9,013,164 B1* | 4/2015 | Lee .................... | H02M 3/156 |
| | | | 323/285 |
| 10,686,375 B1* | 6/2020 | Davis-Marsh ........ | H02M 3/156 |
| 2002/0057125 A1* | 5/2002 | Demizu ............... | H02M 3/156 |
| | | | 327/538 |
| 2023/0043741 A1* | 2/2023 | Jovanovic ........... | H02M 3/1566 |

FOREIGN PATENT DOCUMENTS

| | | | |
|---|---|---|---|
| CN | 105356734 A | * | 2/2016 |
| CN | 113098416 A | * | 7/2021 |
| CN | 113765491 A | * | 12/2021 |

* cited by examiner

*Primary Examiner* — Kyle J Moody
*Assistant Examiner* — Jye-June Lee
(74) *Attorney, Agent, or Firm* — AP3 Law Firm, PLLC

(57) ABSTRACT

A ripple amplitude compensation circuit for ripple-based control of DC-DC converter, wherein the ripple amplitude compensation circuit for adjusts the gains of the voltage loop and ripple loop according to the ripple amplitude. With the present invention, the ripple-based control loop's performance can be optimized.

9 Claims, 6 Drawing Sheets

RIPPLE AMPLITUDE COMPENSATION CIRCUIT FOR RIPPLE BASED CONTROL OF DC-DC CONVERTER

BACKGROUND OF THE INVENTION

The present invention relates to electric power converters and, more particularly, a ripple amplitude compensation circuit for ripple-based control of DC-DC converter.

A DC-DC converter using ripple-based constant on-time control has stability problems when the ripple amplitude changes as a function of $V_{IN}$ and $V_{OUT}$. When the ripple amplitude is too low, the noise and high frequency poles will make the jitter of the converter higher and even unstable. When the ripple amplitude is too high, the phase margin of the control loop will drop, making the loop stability worse.

As a result, when the ripple amplitude changes with $V_{IN}$ and $V_{OUT}$ it is difficult to optimize the load transient and jitter performance. To guarantee the worst-case operation with small ripple amplitude, a designer must accept bad transient response when the ripple amplitude is high.

Ripple voltage generation where its amplitude is always changing with different $V_{IN}$ and $V_{OUT}$ is problematic for additional reasons. When the ripple voltage is too low, the control bandwidth will be too high. With high bandwidth, the system noise and high frequency poles will get into the control loop and cause instability. If the ripple voltage is too high, the control bandwidth will be too low, and the loop phase margin will drop too. This low control loop bandwidth will cause bad transient response.

Put another way, prior art ripple-based control systems only generate the control ripple based on $V_{IN}$ and $V_{OUT}$ information without any compensation. Granted, this methodology is simple and easy to implement, but it has the stability problem and bad transient response with some $V_{IN}$ and $V_{OUT}$ settings.

In the prior art, the ripple is generated through a resistor connected to SW node (equivalent to $V_{IN}$ when PWM is on) or through two transconductance devices (Gm) which are connected to $V_{IN}$ and $V_{OUT}$. This $V_{IN}$ and $V_{OUT}$ voltage are changed to current through the resistor or the transconductance device block (FIG. 1 illustrates the former, though it us understood that the latter configuration is contemplates). The currents will charge a capacitor during PWM on time and discharge the capacitor during PWM off time. The charging current is proportional to voltage ($V_{IN}$–$V_{OUT}$) and the discharge current is proportional to the voltage $V_{OUT}$, causing the control loop problems described above.

As can be seen, there is a need for a ripple amplitude compensation circuit for ripple-based control of DC-DC converter.

The present invention calculates the ripple amplitude for the given $V_{IN}$ and $V_{OUT}$ and adds the compensation to the loop based on the ripple amplitude, which changes time to time, thereby providing better stability and faster transient across all $V_{IN}$ and $V_{OUT}$ settings.

The disclosure adds a ripple amplitude compensator to the loop comparator to compensate the ripple amplitude change of the control ripple. The ripple amplitude compensator is configured to calculate the ripple amplitude and generates two currents proportional to the ripple amplitude. These currents will go to the loop comparator to adjust the gains of the sensed $V_{OUT}$ voltage error and the ripple amplitude. When the ripple amplitude is higher, the gain of the sensed $V_{OUT}$ error will be higher and gain of ripple voltage will be lower. When the ripple amplitude is lower, the gain of $V_{OUT}$ error will be lower, and gain of ripple voltage will be higher. These gain changes can compensate the ripple amplitude changes. Accordingly, with the gain changes, the ripple amplitude variations are compensated so that the loop stability and transient response can be optimized across all $V_{IN}$ and $V_{OUT}$ settings.

The ripple amplitude compensation circuit embodied in the present invention is configured to calculate the ripple amplitude for different $V_{IN}$ and $V_{OUT}$ and compensate the ripple amplitude changes in the control loop. Therefore, the effective ripple amplitude will be relatively constant to the loop so that the stability of the converter can be optimized. Furthermore, with the constant effective ripple amplitude via the ripple amplitude compensation, the transient response can be optimized with the best jitter performance according to the effective ripple amplitude.

SUMMARY OF THE INVENTION

In one aspect of the present invention, a ripple amplitude compensation circuit includes the following: a control logic and driver circuit configured to generate at least one input signal based on a pulse-width modulation (PWM) signal and to control at least one switch to generate an output voltage; an error amplifier configured to generate a first part of the PWM signal based on a reference voltage and a feedback voltage that is based on the output voltage; a ripple voltage generator configured to generate a second part of the PWM signal based on the switching voltage and a ripple amplitude; and a ripple amplitude calculator circuit configured to adaptively calculate the ripple amplitude and generate two adjustment currents proportional to the ripple amplitude, wherein the two currents are compared, via respective comparators, to adjust the gains of the output voltage error and the ripple amplitude, respectively.

In another aspect of the present invention, the ripple amplitude compensation circuit further includes wherein the two adjustment currents includes a voltage loop adjustment current and a ripple loop adjustment current, wherein the voltage loop adjustment current changes a transconductance of the comparator converting a voltage difference between an output of the error amplifier and the output voltage to said first part, wherein the ripple loop adjustment current changes a transconductance of the comparator converting the ripple voltage to said second part, wherein the voltage loop adjustment current is a product of a difference between an input voltage and the output voltage, wherein the ripple loop adjustment current is a product of the output voltage.

In yet another aspect of the present invention, a method of improving stability of a DC-DC converter using ripple-based constant on-time control, the method includes the following: calculating a ripple amplitude of a ripple voltage; generating a ripple loop adjustment current proportional to the ripple amplitude and an output voltage of the DC-DC converter; generating a voltage loop adjustment current proportional to the ripple amplitude and a difference between the output voltage and an input voltage of the DC-DC converter; adjusting, by way of the voltage loop adjustment current, a loop gain of a voltage loop comparing an error voltage and the output voltage; and adjusting, by way of the ripple loop adjustment current, a loop gain of a ripple loop comparing the ripple voltage, wherein the loop adjustment currents are generated by a first current (I_AJ1) which is a product of a difference between an input voltage and the output voltage, wherein the loop adjustment currents are generated by a second current (I_AJ2) which is a product of the output voltage; and further including four transistors (M11-M14) configured to change the first and second currents I_AJ1 and IAJ2 to IB_ADJ, which is proportional to the ripple amplitude.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a ripple amplitude compensation circuit for ripple-based control of DC-DC converter, wherein the ripple amplitude compensation circuit adjusts the gains of the voltage loop and ripple loop according to the ripple amplitude. With the present invention, the ripple-based control loop's performance can be optimized.

Figure 1:
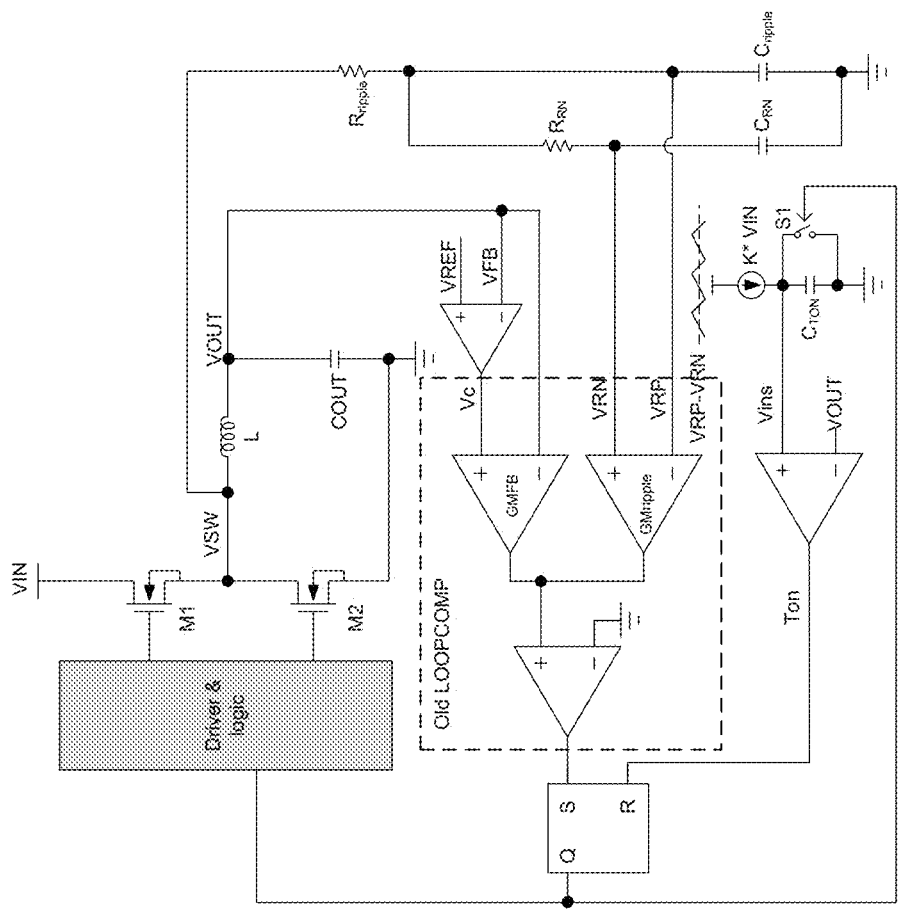
FIG. 1 is a schematic diagram of a prior art ripple-based control circuit, illustrating that when the ripple generator uses a resistor connected to SW, the ripple amplitude on node VRP is: Ripple_amplitude=$(V_{OUT}*(V_{IN}-V_{OUT}))/(V_{IN}*Fsw*Cripple*Rripple)$, wherein Cripple is the capacitor, which is charged and discharged, and Rripple is the resistor connected to SW and Cramp. From this equation, the ripple amplitude will change with $V_{IN}$, $V_{OUT}$, and the switching frequency (Fsw), causing control loop problems.
Figure 2:
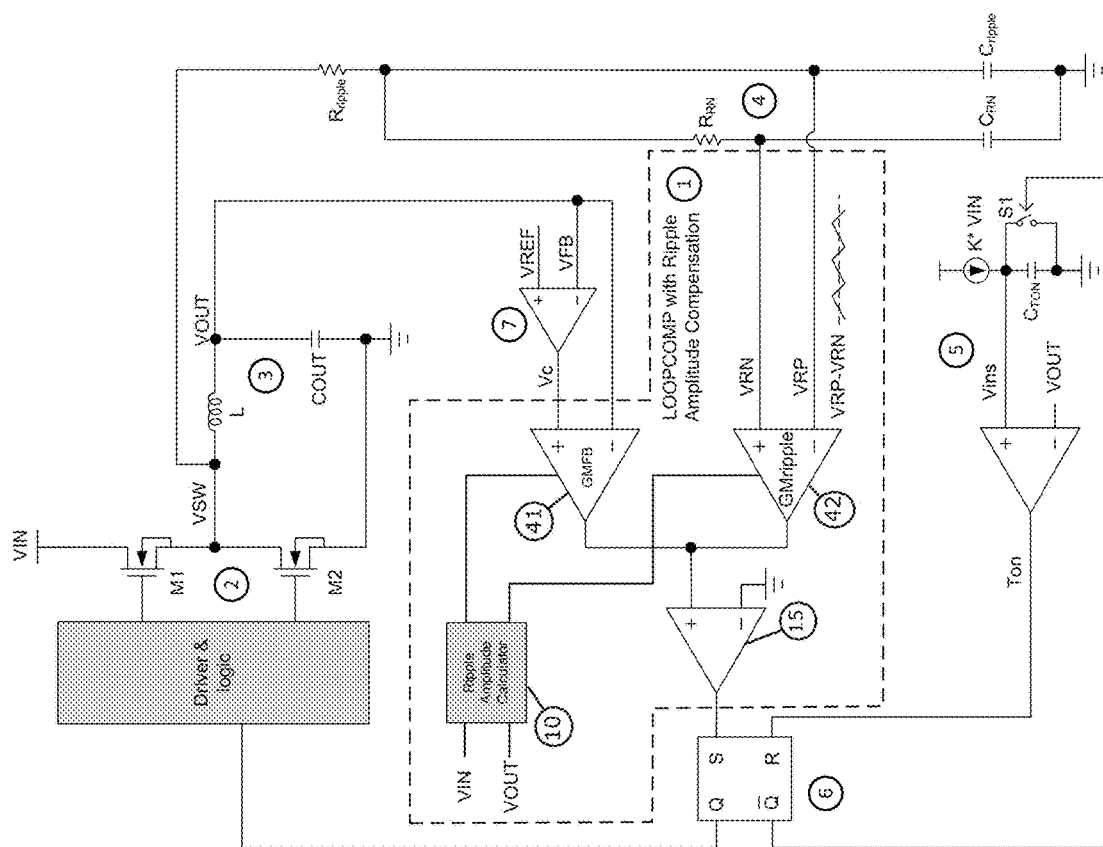
FIG. 2 is a schematic diagram of a ripple-based buck converter with the ripple amplitude compensation circuit in accordance with this disclosure.

Referring now to FIG. 2, a ripple amplitude calculator 10 is added to the loop comparator 1 via the GMFB and GMripple. The ripple amplitude compensation is enabled by way of the ripple amplitude calculator 10, which is configured to calculate the ripple amplitude and generate the adjusting currents according to the $V_{IN}$ and $V_{OUT}$ information The adjusting currents are sent to GMFB and GMripple to adjust the transconductance of these two blocks.

The loop comparator with ripple amplitude compensation 1 is connected to the ripple-based converter providing power stage and driver logic 2 (e.g., driver and logic, M1 and M2), an output power filter 3 (e.g., L and $C_{OUT}$), ripple voltage generator 4 (e.g., Rripple, Cripple, RRN, CRN), a $T_{ON}$ generator 5, PWM Logic 6 (configured for the ripple-based control), and an error amplifier 7.

The error amplifier 7 is inserted upstream of the transconductance device GmFB 41 and is coupled to receive the regulating reference voltage. The error amplifier 7 serves to increase DC regulation accuracy. The output of the error amplifier 7 follows the load current and is fed to the reference input of the hysteresis comparator.

Figure 3:
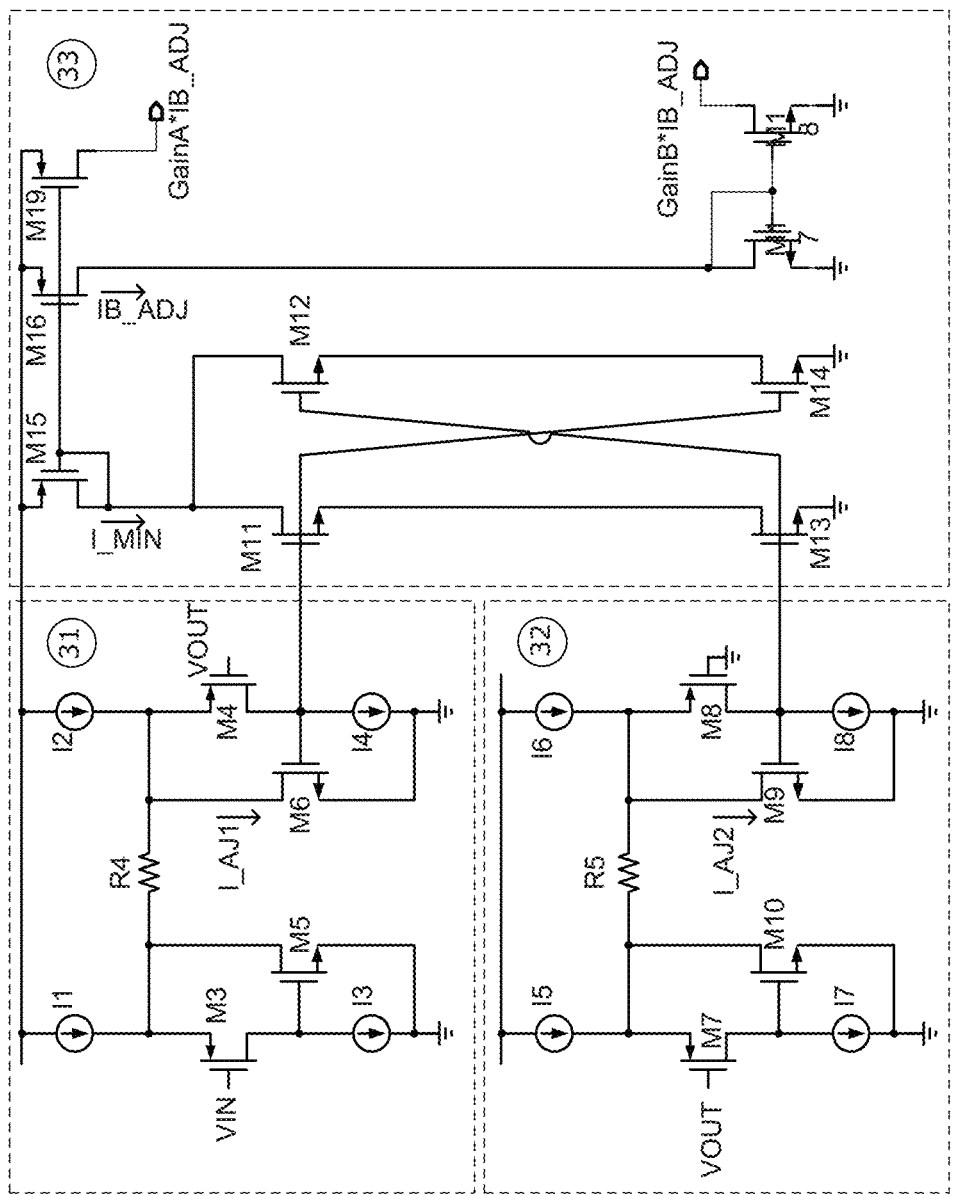
FIG. 3 is a schematic diagram of a ripple amplitude calculator circuit in accordance with this disclosure.

Referring to FIG. 3, the details of the ripple amplitude calculator 10 implementation include a $Gm_{ON}$ circuit 31 for $V_{IN}-V_{OUT}$, a $Gm_{OFF}$ circuit 32 for the $V_{OUT}$, and a minimum current selection and current shape correction circuitry 33. The $Gm_{ON}$ circuit 31 senses the voltage of $V_{IN}$ at the gate of M3. The sensed $V_{IN}$ voltage is level shifted up by the VGS of M3 and connected to the R4. The $V_{OUT}$ is sensed by M4 and connected to the other terminal of R4 after the same VGS level shift. The $Gm_{ON}$ circuit 31 applies the difference between $V_{IN}$ and $V_{OUT}$, $V_{IN}-V_{OUT}$, across the R4. So, the current in R4 will be $(V_{IN}-V_{OUT})/R4$. Similarly, the $V_{OUT}-$GND is applied across the R5 in $Gm_{OFF}$ circuit 32. And current in R5 is $(V_{OUT}-$GND$)/R5$. In $Gm_{ON}$ circuit 31 and $Gm_{OFF}$ circuit 32, the I2=I4=I6=I8, so the current in R4 will be equals to I_AJ1 which is the drain current of M6. The current, I_AJ2, in M9 is equals to current in R5. As the result:

$$I\_AJ1=(V_{IN}-V_{OUT})/R4$$

$$I\_AJ2=(V_{OUT}-\text{GND})/R5$$

Figure 5A:
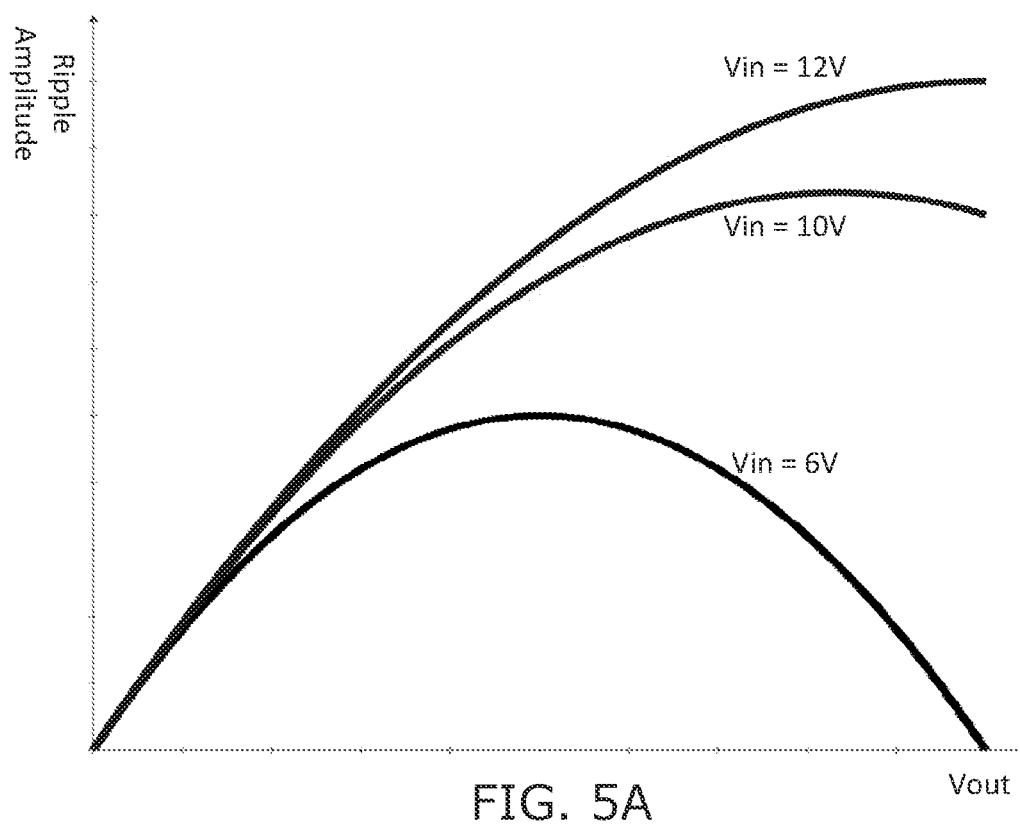
FIG. 5A is a calculation result of a ripple amplitude change with $V_{IN}$ and $V_{OUT}$ in accordance with this disclosure.
Figure 5B:
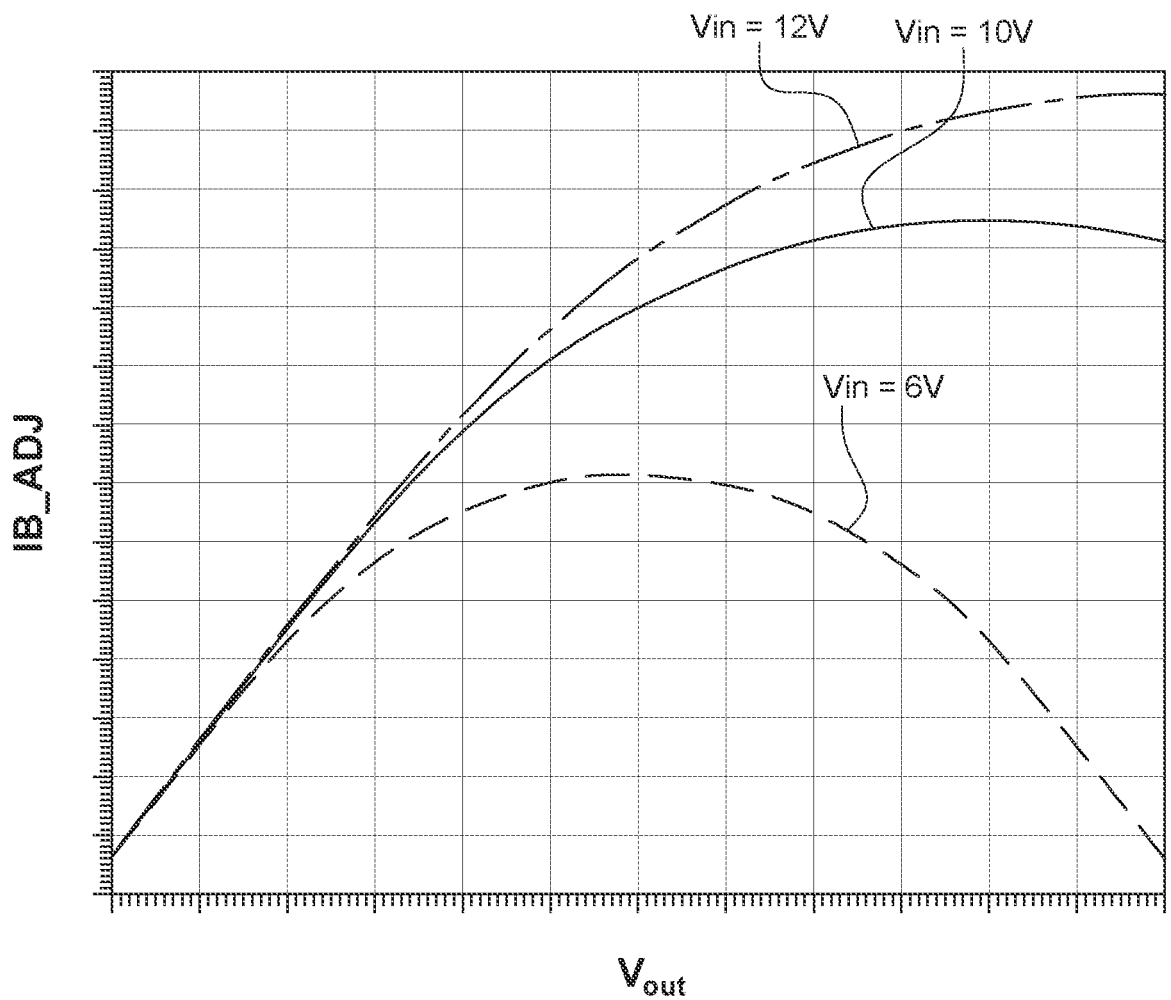
FIG. 5B is a current value of simulation results for the IB_ADJ with $V_{IN}$ and $V_{OUT}$ in accordance with this disclosure.

The M11 and M14's gates are connected to the gate of M6. M12 and M13's gates are connected to the gate of M9. The M11 is in series with M13, and M12 is in series with M14. With this circuit, the current in M15 (I_MIN) will change with Vin and $V_{OUT}$. The value of the I_MIN is proportional to the ripple amplitude. The ripple amplitude and the current of I_MIN are compared in FIGS. 5A and 5B with different $V_{IN}$ and $V_{OUT}$. The current mirrors, M16-M19, generates the compensation current GainA*IB_ADJ and GainB*IB_ADJ to adjust the tail currents of the relevant transconductance device in the loop comparator.

Figure 4:
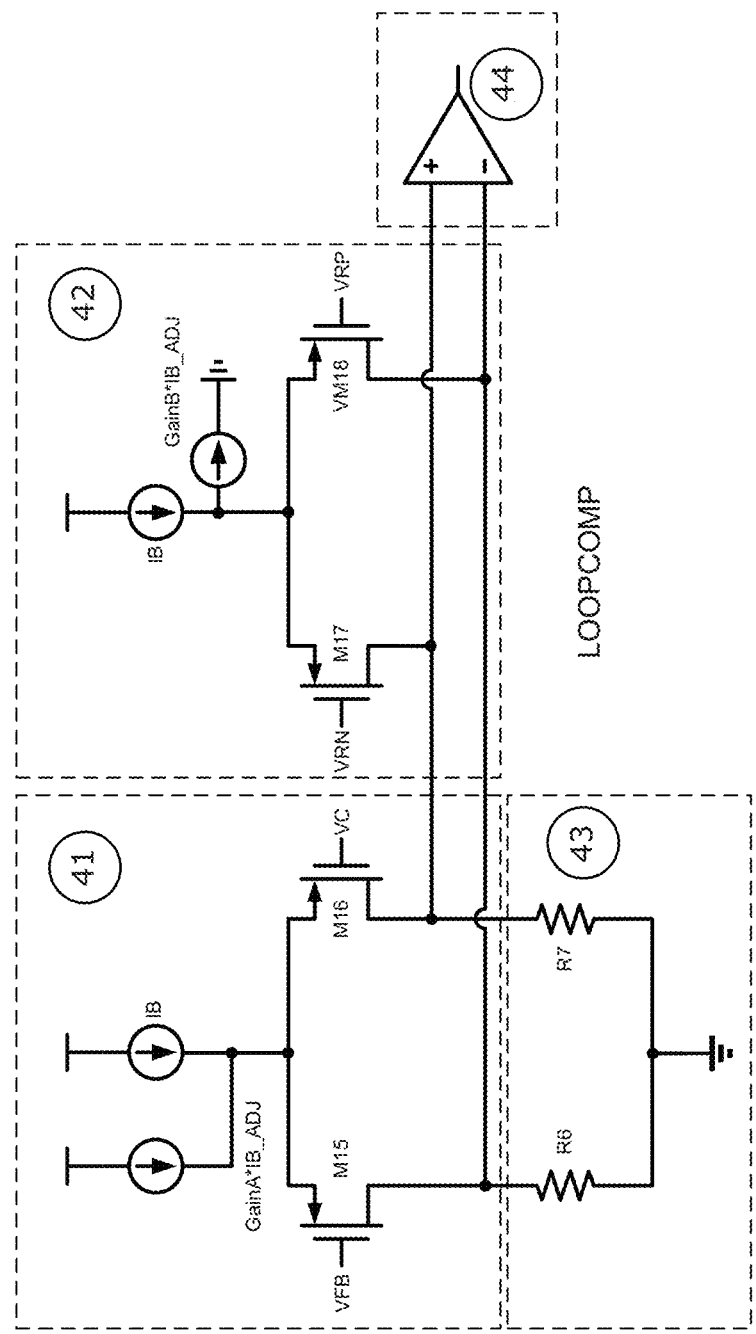
FIG. 4 is a schematic diagram of a loop comparator circuit with ripple amplitude compensation and adjustable gain in accordance with this disclosure.

Referring to FIG. 4, the loop comparator circuit with ripple amplitude compensation 1 may include a GmFB 41 for the gain of the voltage loop, a GMripple 42 for the gain of the ripple loop, resistors 43 to change error current to error voltage, and a comparator 44 of the error signals. Each loop comparator circuit may have an adjustable tail current to adjust the transconductance of the two transconductance devices (GmFB 41 and GMripple 42) in the loop comparator, since transconductance Gm of a transconductance device is in direct proportion to the tail current. Thereby, the ripple amplitude calculator 10 controls the tail current of the differential pairs/transconductance devices for which gain stabilization is performed.

GMripple 42 controls the ripple loop gain by converting the voltage difference between VRP and VRN to current. When the ripple amplitude is higher, the ripple loop gain will be higher due to the larger input signal. The changing ripple loop gain associated with the ripple amplitude is causing the stability and transient problems of the DC-DC converter. By adding the adjustable tail current GainB*IB_ADJ, when the ripple amplitude is higher, the tail current of GMripple will be lower. The smaller tail current will reduce the transconductance of the GMripple and reduce the ripple loop gain.

The other transconductance device, GMFB 41, controls the voltage loop gain and converts the voltage difference between VC (control voltage, output of the error amplifier 7) and VFB (feedback voltage) to current. When the ripple amplitude is higher, the tail current (IB+GainA*IB_ADJ) is higher, which makes the voltage loop gain higher. The higher voltage loop gain can compensate the higher ripple loop gain too. The output currents of the two transconductance devices are converted to voltage by R6 and R7 and compared by the final stage of the loop comparator 44 to generate the set signal of the PWM.

With the adjusted voltage loop and ripple loop gain according to the ripple amplitude, the stability and transient problems are solved in the ripple-based DC-DC converter.

The circuitry can be provided in an integrated silicon chip, an IC package (e.g., collectively or individually in one or more chips) or built on PCB using discrete components. The ripple amplitude calculator and the loop comparator with adjustable gains for voltage and ripple loop are necessary.

Other compensation methods, like adjusting the gain of the error amplifier 7 or the ripple generator 4 values is contemplated by the present invention. Changing the output of the ripple amplitude calculator to voltages is also contemplated.

A method of using the present invention may include the following. A user may add the ripple amplitude calculator into the converter system, whereby the results of the ripple amplitude calculator are used to adjust the loop gain of the voltage loop and the ripple loop; for instance, when the ripple amplitude is higher, may adjust the ripple loop gain lower and make the voltage loop gain higher, and when the ripple amplitude is lower, make the ripple loop gain higher and make the voltage loop gain lower.

Also, the present invention has applicability to monolithic power converter, DC-DC power supply, and DC-DC controller applications.

It should be understood, of course, that the foregoing relates to exemplary embodiments of the invention and that modifications may be made without departing from the spirit and scope of the invention as set forth in the following claims.

What is claimed is:

1. A ripple amplitude compensation circuit, comprising:
   a control logic and driver circuit configured to generate at least one input signal based on a pulse-width modulation (PWM) signal and to control at least one switch to generate an output voltage;
   an error amplifier configured to generate a first part of the PWM signal based on a reference voltage and a feedback voltage that is based on the output voltage;
   a ripple voltage generator configured to generate a second part of the PWM signal based on a switching voltage and a ripple amplitude; and
   a ripple amplitude calculator circuit configured to adaptively calculate the ripple amplitude and generate a first adjustment current and a second adjustment current proportional to the ripple amplitude, wherein the first adjustment current is configured to adjust a gain of an output voltage error via a first comparator, and the second adjustment current is configured to adjust a gain of the ripple amplitude via a second comparator.

2. The ripple amplitude compensation circuit of claim 1, wherein the first adjustment current comprises a voltage loop adjustment current and the second adjustment current comprises a ripple loop adjustment current.

3. The ripple amplitude compensation circuit of claim 2, wherein the voltage loop adjustment current changes a transconductance of the first comparator which converts a voltage difference between an output of the error amplifier and the output voltage to said first part of the PWM signal, wherein the ripple loop adjustment current changes a transconductance of the second comparator which converts the ripple amplitude to said second part of the PWM signal.

4. The ripple amplitude compensation circuit of claim 3, wherein the voltage loop adjustment current is a product of a difference between an input voltage and the output voltage.

5. The ripple amplitude compensation circuit of claim 4, wherein the ripple loop adjustment current is a product of the output voltage.

6. A method of improving stability of a DC-DC converter using ripple-based constant on-time control, the method comprising:
   calculating a ripple amplitude of a ripple voltage;
   generating a ripple loop adjustment current proportional to the ripple amplitude and an output voltage of the DC-DC converter;
   generating a voltage loop adjustment current proportional to the ripple amplitude and a difference between the output voltage and an input voltage of the DC-DC converter;
   adjusting, by way of the voltage loop adjustment current, a loop gain of a voltage loop comparing an error voltage and the output voltage; and
   adjusting, by way of the ripple loop adjustment current, a loop gain of a ripple loop comparing the ripple voltage.

7. The method of claim 6, wherein the voltage loop adjustment current and the ripple loop adjustment current are generated by a first current (I_AJ1) which is a product of a difference between the input voltage and the output voltage.

8. The method of claim 7, wherein the voltage loop adjustment current and the ripple loop adjustment current are generated by a second current (I_AJ2) which is a product of the output voltage.

9. The method of claim 8, further comprising four transistors (M11-M14) configured to change the first and second currents I_AJ1 and IAJ2 to a third current IB_ADJ, which is proportional to the ripple amplitude.

* * * * *